US007751816B2

(12) United States Patent
Jung

(10) Patent No.: US 7,751,816 B2
(45) Date of Patent: Jul. 6, 2010

(54) METHOD OF REGISTERING A MOBILE NODE IN A FOREIGN NETWORK IN A MOBILE IP ENVIRONMENT AND MOBILE IP NETWORK BY OMITTING AGENT DISCOVERY

(75) Inventor: Jae-gyu Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 355 days.

(21) Appl. No.: 11/196,419

(22) Filed: Aug. 4, 2005

(65) Prior Publication Data

US 2006/0187896 A1    Aug. 24, 2006

(30) Foreign Application Priority Data

Jan. 25, 2005    (KR)    ............... 10-2005-0006802

(51) Int. Cl.
*H04W 4/00*    (2009.01)
(52) U.S. Cl. ............ 455/432.1; 455/436; 455/435.1; 370/328
(58) Field of Classification Search ............ 370/270, 370/259, 331; 455/432.1
See application file for complete search history.

(56) References Cited

U.S. PATENT DOCUMENTS

| | | | |
|---|---|---|---|
| 6,192,230 B1 * | 2/2001 | van Bokhorst et al. ... | 455/343.3 |
| 6,230,012 B1 | 5/2001 | Willkie et al. | |
| 6,721,291 B1 * | 4/2004 | Bergenwall et al. ......... | 370/331 |
| 6,930,988 B2 * | 8/2005 | Koodli et al. ............... | 370/331 |
| 7,339,928 B2 * | 3/2008 | Choyi et al. ................. | 370/390 |
| 2005/0083886 A1 * | 4/2005 | Ikeda ......................... | 370/331 |

FOREIGN PATENT DOCUMENTS

| | | |
|---|---|---|
| EP | 1 473 901 A2 | 11/2004 |
| JP | 8-265831 A | 10/1996 |
| KR | 10-0384887 B1 | 5/2003 |
| KR | 10-0395486 B1 | 8/2003 |
| KR | 10-2004-0073843 A | 8/2004 |

OTHER PUBLICATIONS

C. Perkins, IP Mobility Support, Request for Comments 2002, Oct. 1996, p. 16.*
G. Dommety, A. Yegin, C. Perkins, G. Tsirtsis, K. El-Malki, M. Khalil, "draft-ietf-mobileip-fast-mipv6-03.txt", Jul. 2001.*
Nicolas Montavont and Thomas Noel, "Handover Management for Mobile Nodes in IPv6 Networks", Aug. 2002, IEEE Communication Magazine.*
Chiung-Shien Wu, et al.: "Intelligent handoff for mobile wireless Internet", Mobile Networks and Applications—Kluwer Academic Publishers, [Online] 2001, pp. 67-79, the Netherlands, ISSN: 1383-469X, URL:http://deliverv.acm.org/10.1145/390000/380231/p67-wu/pdf?key1=380231&key2=1246943611&coll=GUIDE&dl=GUIDE&CFID=6087845&CFTOKEN=515 76276 [retrieved on Nov. 14, 2006], Sections 2, 2.1, 2.2, 3, 3.2, 5, 5.1.1, 5.2, 5.3.
El Malki K et al.: "Low Latency Handoffs in Mobile IPv4", IETF Standard-Working-Draft, Internet Engineering Task Force, IETF, CH, vol. mobileip, No. 9, Jun. 2004, ISSN: 0000-0004, Sections 3.1, 3.2, 3.3, 3.4, 3.4.1, 3.5, 3.6, 4.4.
Jongin Park et al.: "The Layer 2 Handoff Scheme for Mobile IP over IEEE 802.11 Wireless LAN", Springer-Verlag, 2004, pp. 1144-1150, Berlin, Heidelberg, Germany, Sections 2, 3.1, 4.

* cited by examiner

*Primary Examiner*—Nick Corsaro
*Assistant Examiner*—Vladimir Magloire
(74) *Attorney, Agent, or Firm*—Sughrue Mion, PLLC

(57) ABSTRACT

A method of registering a mobile node on a home agent in a mobile IP environment and a mobile IP network system using the same are provided. The method of registering a mobile node on a home agent in a mobile IP environment includes: collecting care-of-addresses of foreign agents of subnets adjacent to a first subnet in which the mobile node currently resides; broadcasting messages containing the collected care-of-addresses when the mobile node moves from the first subnet to a second subnet adjacent to the first subnet; in the foreign agent of the second subnet, receiving the broadcast messages and extracting the care-of-addresses; and in the foreign agent of the second subnet, transmitting the extracted care-of-address to a home agent of the mobile node to register the mobile node on the home agent if one of the extracted care-of-addresses is identical to the care-of-address allocated by the foreign agent of the second subnet.

9 Claims, 6 Drawing Sheets

FIG. 4

| Type | Length | Sequence number | | | | | | | |
|------|--------|-----------------|---|---|---|---|---|---|---|
| Registration Lifetime | | R | B | H | F | M | G | V | reserved |
| Zero or more care-of-address(410) | | | | | | | | | |
| Neighbor CoAs(420) | | | | | | | | | |

METHOD OF REGISTERING A MOBILE NODE IN A FOREIGN NETWORK IN A MOBILE IP ENVIRONMENT AND MOBILE IP NETWORK BY OMITTING AGENT DISCOVERY

CROSS-REFERENCE TO RELATED APPLICATION

This application claims priority from Korean Patent Application No. 10-2005-0006802 filed on Jan. 25, 2005 in the Korean Intellectual Property Office, the disclosure of which is incorporated herein by reference in its entirety.

BACKGROUND OF THE INVENTION

1. Field of the Invention

Methods and systems consistent with the present invention relate to registration of mobile nodes in a mobile Internet Protocol (IP) environment, and more particularly, to minimizing a time required for registering a mobile node by omitting an agent discovery procedure to be typically performed whenever a mobile node moves to a new subnet.

2. Description of the Related Art

Due to technological advancements in a mobile communication, mobile networks have changed from conventional channel-based mobile networks to packet-based mobile networks for a fast data processing. Most of the recent mobile communication services such as GPRS, CDMA2000-1X, 1X-EVDO, or W-CDMA adopt packet-based networks to process data. The demand for packet-based network is also increasing.

In such packet-based networks, a mobile IP address is given to each mobile node in order to allow the mobile nodes to have mobility without having to change their IP addresses. By obtaining the mobile IP address, each mobile node can remain in communication without having to reestablish upper-layer protocols, such as Transmission Control Protocol (TCP) while it is on the move.

However, in order to remain in communication with a correspondent node without interruption when the mobile node having the mobile IP address moves to a new subnet, the mobile node should obtain a new care-of-address (CoA) from a foreign agent (FA), i.e., a mobile IP agent of the new subnet, and register the CoA obtained from the FA to an original home agent (HA) in its home network.

For that reason, when the mobile node moves to a new subnet, the mobile node receives an agent advertisement message from a new FA, or voluntarily broadcasts an agent solicitation message to solicit the new FA to broadcast the agent advertisement message.

As a result, the mobile node is informed of its CoA through the agent advertisement message, and the CoA is registered again on the HA via the FA.

FIG. 1 is a network diagram for describing how a conventional system operates when a mobile node having a mobile IP address moves to a new foreign subnet.

For example, a mobile node 110 having its mobile IP address should go through an Agent Discovery procedure, a Registration procedure, and a Tunneling procedure in order to continuously transmit data to and receive data from a correspondent node 120 after the mobile node 110 moves from a home network 130 to a foreign network 140, and registers its location on an HA 135 in its home network 130 via an FA 145 of the foreign network 140.

During the Agent Discovery procedure, the mobile node 110 identifies the presence of the FA 145 in the new subnet (the foreign network) 140. This procedure may be performed through two methods. One method is that the FA 145 periodically broadcasts an agent advertisement message containing a CoA to the entire new subnet (the foreign network) 140 to which the FA 145 belongs, in order to announce its presence. The other method is that the mobile node 110 voluntarily broadcasts an agent solicitation message to the new subnet (the foreign network) 140 to solicit the new FA 145 to broadcast the agent advertisement message.

During the Registration procedure, the mobile node 110 registers its CoA obtained from the FA 145 during the Agent Discovery procedure on the HA 135 via the FA 145 through a registration request message. In other words, when the mobile node 110 broadcasts the registration request message containing its mobile IP address, CoA, and HA address, the FA 145 forwards the CoA to the HA 135. As a result, the HA 135 can identify the mobile node's location.

During the Tunneling procedure, a packet transmitted from the correspondent node 120 is forwarded to the HA 135, and the HA 135 transmits the received packet to the FA 145 through an IP tunneling. Then, the FA 145 forwards the received packet to the mobile node 110. In this case, a triangle routing problem occurs that the packet is transmitted from the correspondent node 120 to the mobile node 110 via the HA 135, thus unnecessarily causing the packet to go through the HA 135.

In order to solve such a problem, the correspondent node 120 transmits a binding request message, and a direct connection between the correspondent node 120 and the mobile node 110 is made through the binding update message.

A conventional method of minimizing packet losses during a handover operation is shown in FIG. 2. According to this method, a new FA transmits a binding update message to a previous FA, so that the packets buffered in the previous FA during the handover are not discarded but transmitted directly to the new FA.

On the other hand, a mobile node cannot obtain a new CoA until an agent advertisement message is received from the FA of the new subnet. As a result, the mobile node cannot register its location on an HA on its own.

Therefore, in the conventional system, if the agent advertisement message is not received from the new FA as well as from the previous FA, the mobile node broadcasts the agent solicitation message to the new subnet to solicit the new FA to broadcast the agent advertisement message. However, in a real-time communication, the time required for the Agent Discovery procedure may cause communication delay, degradation of quality of service, and even disconnection between the mobile node and the correspondent node.

Korean Unexamined Publication No. 2004-0073843 discloses a fast handover method in a mobile IP network environment. In this method, an access router transmits directly a response message through a routine cache table without notifying an upper-layer router, in case of a pre-registration message cached in the terminal. However, Korean Unexamined Publication No. 2004-0073843 does not disclose a method of solving the aforementioned problem occurring in the Agent Discovery procedure.

Accordingly, there a need for a method of registering the location of the mobile node on the HA, with quality of service being guaranteed without performing the Agent Discovery procedure.

SUMMARY OF THE INVENTION

The present invention provides a method of registering a CoA of a mobile node on an HA without performing an Agent Discovery procedure after the mobile node obtains its CoA in an adjacent foreign network through information provided from a previous FA.

According to an aspect of the present invention, there is provided a method of registering a mobile node in a mobile IP environment, comprising: collecting CoA's of foreign agents of subnets adjacent to a first subnet in which the mobile node currently resides; broadcasting messages containing the collected care-of-addresses when the mobile node moves from the first subnet to a second subnet adjacent to the first subnet; in the foreign agent of the second subnet, receiving the broadcast messages and extracting the care-of-addresses; and in the foreign agent of the second subnet, transmitting the extracted care-of-address to a home agent of the mobile node to register the mobile node on the home agent if one of the extracted care-of-addresses is identical to the care-of-address allocated by the foreign agent of the second subnet.

According to another aspect of the present invention, there is provided a mobile IP network system in a mobile IP environment comprising: a first foreign agent of a first foreign subnet, the first foreign agent having information on care-of-addresses of other foreign agents adjacent to the first subnet; a second foreign agent of a second subnet; and a mobile node registering its path on a home agent of the mobile node via the second foreign agent when moving from the first subnet to the second subnet, wherein the mobile node receives, from the first foreign agent, a message containing the care-of-addresses of the foreign agents adjacent to the first subnet, collects the care-of-addresses from the message, and broadcasts a message containing the collected care-of-addresses after it moves to the second subnet, and wherein the second foreign agent receives the broadcast message, extracts the care-of-addresses, and transmits one of the extracted care-of-addresses to the home agent to register the mobile node on the home agent if one of the extracted care-of-addresses is identical to the care-of-address allocated by the second foreign agent.

BRIEF DESCRIPTION OF THE DRAWINGS

The above and other aspects of the present invention will become more apparent by describing in detail exemplary embodiments thereof with reference to the attached drawings in which:

FIG. 4 is a packet diagram illustrating an exemplary data structure of an agent advertisement message according to an exemplary embodiment of the present invention;

DETAILED DESCRIPTION OF EXEMPLARY EMBODIMENTS OF THE INVENTION

Exemplary embodiments of the present invention will be described in detail with reference to the attached drawings.

The invention may, however, be embodied in many different forms and should not be construed as being limited to the exemplary embodiments set forth herein; rather, these exemplary embodiments are provided so that this disclosure will be thorough and complete, and will fully convey the concept of the invention to those skilled in the art. Thus, it is intended that the present invention cover the modifications and variations of this invention provided they come within the scope of the appended claims and their equivalents.

The present invention is described hereinafter with reference to flowchart illustrations of user interfaces, methods, and computer program products according to exemplary embodiments of the invention. It will be understood that each block of the flowchart illustrations, and combinations of blocks in the flowchart illustrations, can be implemented by computer program instructions. These computer program instructions can be provided to a processor of a general purpose computer, a special purpose computer, or other programmable data processing apparatus to produce a machine, such that the instructions which are executed via the processor of the computer or other programmable data processing apparatus create means for implementing the functions specified in the flowchart block or blocks.

These computer program instructions may also be stored in a computer-usable or computer-readable memory that can direct a computer or other programmable data processing apparatus to function in a particular manner, such that the instructions stored in the computer usable or computer-readable memory produce a product including instructing means that implement the function specified in the flowchart block or blocks.

The computer program instructions may also be loaded onto a computer or other programmable data processing apparatus to cause a series of operational steps to be performed on the computer or other programmable apparatus to produce a computer-implemented process such that the instructions that are executed on the computer or other programmable apparatus provide steps of implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

Figure 1:
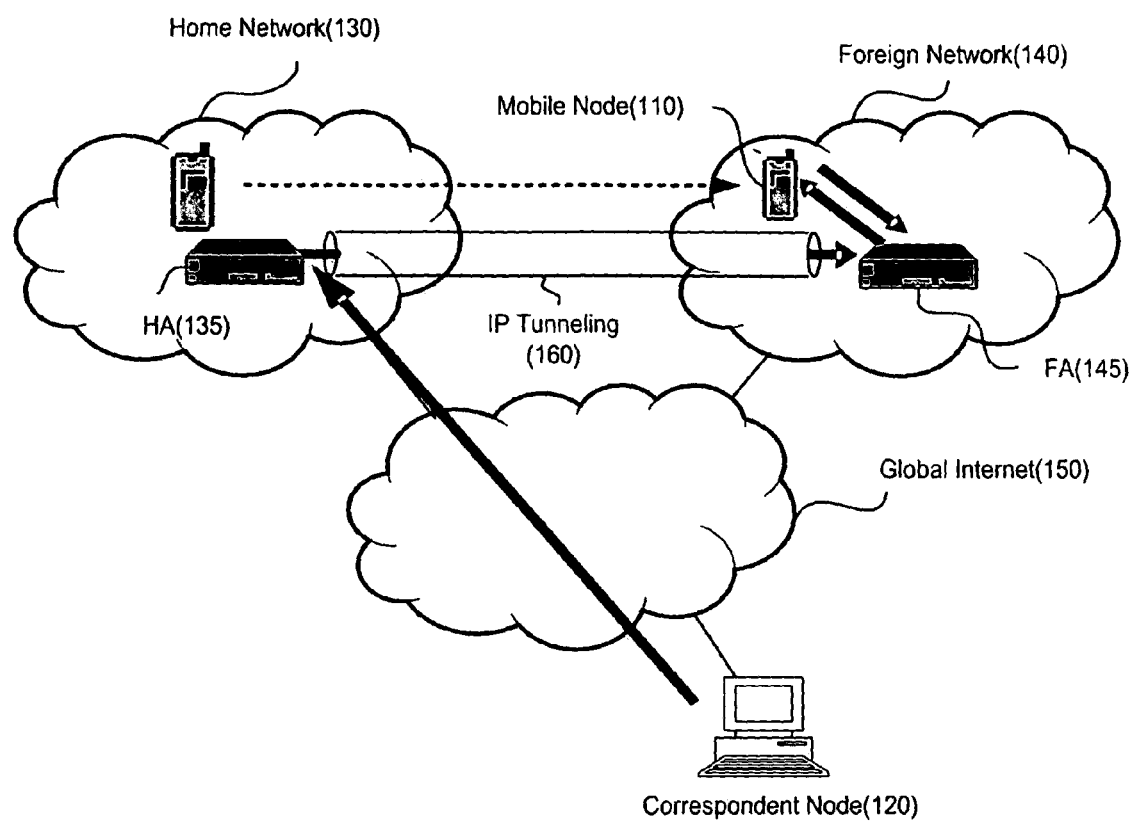
FIG. 1 is a network diagram for describing operations of a conventional system when a mobile node having a mobile IP address moves to a new foreign subnet.
Figure 2:
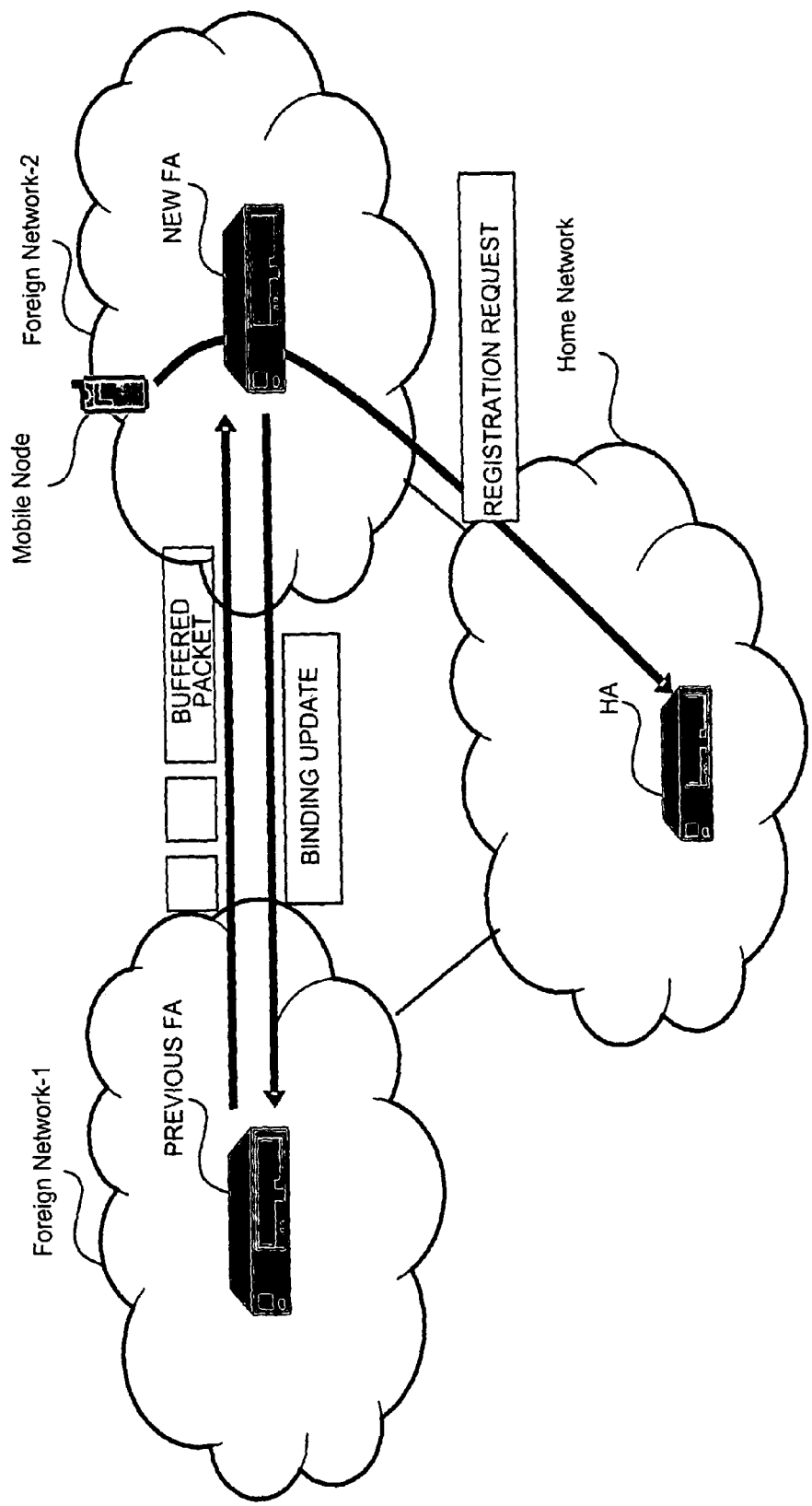
FIG. 2 is a network diagram for describing a conventional fast handover operation.
Figure 3:
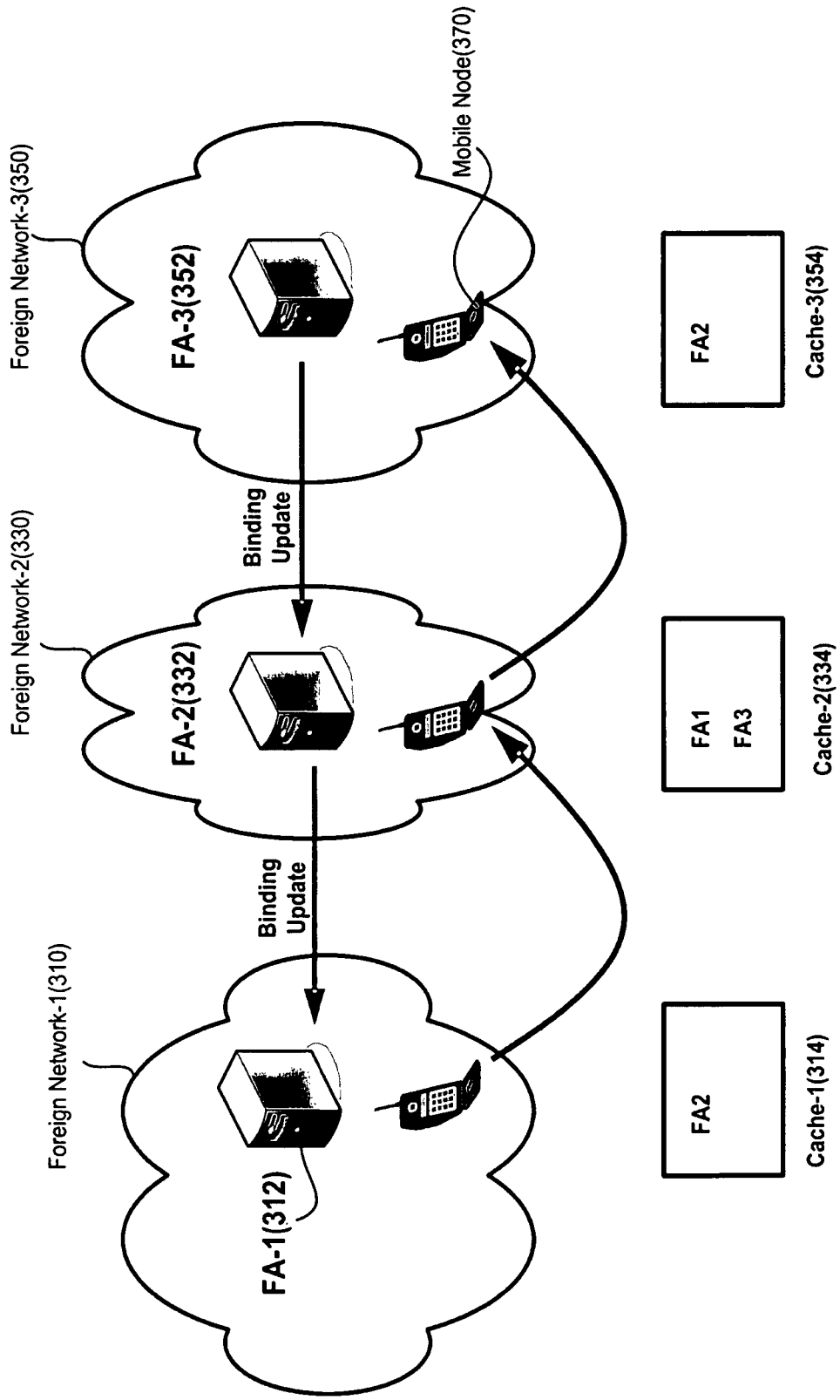
FIG. 3 is a schematic diagram for describing a system for registering a mobile node according to an exemplary embodiment of the present invention.

FIG. 3 is a schematic diagram for describing a system for registering a mobile node according to an exemplary embodiment of the present invention.

Each of a plurality of FA's, FA-1 312, FA-2 332 and FA-3 352, transmits a binding update message to a previous FA when a mobile node 370 moves to a new subnet and then completes registration. The binding update message may contain information on CoA's (FA1, FA2 or FA3) from the new FA's. The previous FA receiving the binding update message stores the CoA's in a corresponding separate cache 314, 334 or 354. Since the binding update message is transmitted from the FA of the new subnet to which the mobile node 370 moves, it is possible to determine that the new FA or the new subnet is a neighbor of (i.e., adjacent to) the previous FA or the previous subnet.

The CoA's (FA1, FA2 or FA3) stored in the cache 314, 334 or 354 are deleted when they are not updated within a predetermined time limit based on timing information measured in a timer provided in each of the FA-1 312, the FA-2 332 and the FA-3 352. The agent advertisement message transmitted from the FA-1 312, the FA-2 332 or the FA-3 352 contains the CoA's of the adjacent FA's stored in the corresponding cache 314, 334 or 354, as well as the CoA of the transmitting FA. Therefore, the mobile node 370 can also obtain the CoA's of the FA's of the neighbor subnets by using the agent advertisement message transmitted from the FA of the subnet in which the mobile node 370 currently resides.

FIG. 4 is a packet diagram illustrating an exemplary data structure of an agent advertisement message according to an exemplary embodiment of the present invention. In this diagram, it is recognized that a neighbor CoA's field 420 is added to a conventional agent advertisement message format in order for the FA to inform the mobile node 370 residing in its subnet of the CoA's of the neighbor FA's. In this case, a zero or more CoA field 410 contains the CoA of the current FA. In other words, the agent advertisement message transmitted from the new FA to the mobile node 370 entering the new subnet contains the CoA's of the neighbor FA's as well as the CoA of the new FA.

Other fields of the agent advertisement message shown in FIG. 4 and their operations in the mobile IP environment, which will be referred in the exemplary embodiments of the present invention, will not be discussed because they are described in an IP Mobility Support RFC2002 standard in detail.

Figure 5:
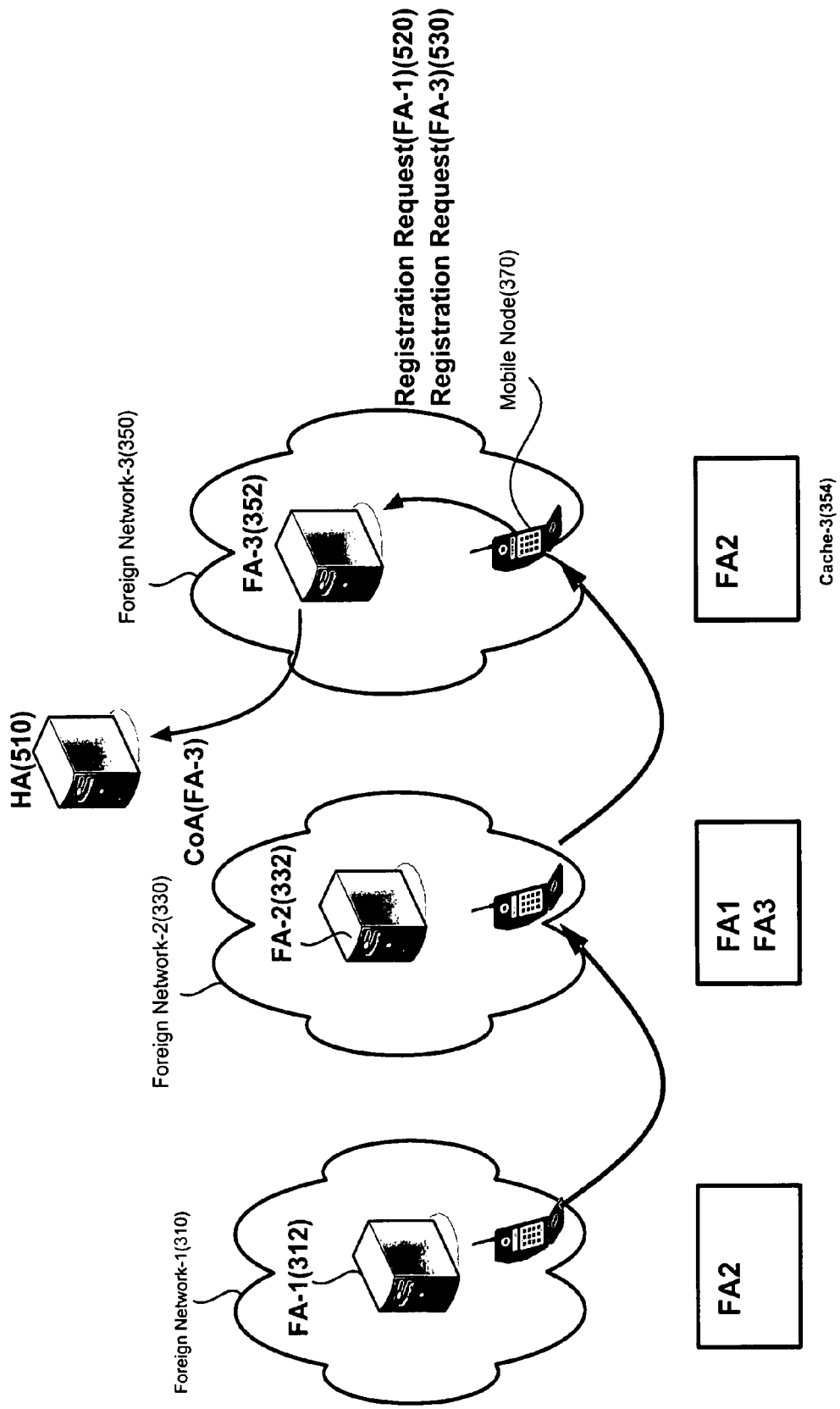
FIG. 5 is a schematic diagram for describing a method of registering a CoA according to an exemplary embodiment of the present invention.

FIG. 5 is a schematic diagram for describing a method of registering a CoA according to an exemplary embodiment of the present invention, which will be described in association with FIG. 3.

The mobile node 370 waits for the agent advertisement message from the new FA-3 352 or prohibits transmission of the agent solicitation message right it after recognizes disconnection with the previous FA-2 332 by, for example, expiration in a lift-timer or an L2 trigger. Instead, the mobile node 370 directly transmits at least one registration request message to the HA 510 via the FA-3 352, wherein the registration request message contains at least one the CoA's (i.e., FA1 and FA3 in this case) already known from the agent advertisement message of the previous FA-2 332, i.e., the agent advertisement message received from the FA-2 332 when the mobile node 370 resides in the second foreign network 330. In particular, the mobile node 370 may sequentially transmit to the FA-3 352 a plurality of registration request messages each containing one of the CoA's. Alternatively, the mobile node 370 may transmit a single registration request message containing all of the CoA's.

If the new FA-3 352 determines that the CoA('s) contained in the registration request message transmitted from the new mobile node 370 is different from the CoA that has been allocated by the new FA-3 352, the registration request message is discarded. Then, if the registration request message containing the CoA that has been allocated by the new FA-3 352 is not received from the corresponding mobile node 370 within a predetermined time limit, the new FA-3 352 immediately broadcasts the agent advertisement message to the third foreign network 350 corresponding to the new FA-3 352.

If the new FA-3 352 determines that one of the CoA's contained in the registration request message(s) transmitted from the new mobile node 370 is identical to the CoA that has been allocated by the new FA-3 352, the registration request message containing the identical CoA is forwarded to the HA address contained in the registration request message.

Meanwhile, when the registration request message is broadcast to the new subnet (foreign network-3) 350, the mobile node 370 sequentially broadcasts the CoA's FA1 and FA3 of the neighbor FA's 312 and 352 stored when the mobile node 370 resides in the previous subnet (foreign network-2) 330. Therefore, the new FA-3 352 cannot identify how many registration request messages containing the CoA's will be transmitted from the mobile node 370.

Accordingly, in order to solve this problem, if the new FA-3 352 does not receive the second registration request message within a predetermined time limit after the first registration request message is received from the mobile node 370, the new FA-3 352 determines that no more registration request messages will be transmitted from the mobile node 370.

Alternatively, a reserved field in the registration request message may be utilized. For example, it is possible to establish the reserved field in such a way that a bit of "1" indicates that another registration request message will be followed and a bit of "0" indicates that no more registration request messages will be transmitted.

Alternatively, a predetermined number of bits in the reserved field of the registration request message can be utilized to represent a total number of the registration request messages that have been previously transmitted or will be subsequently transmitted. This will allow the new FA-3 352 to identify the number of the registration request messages transmitted from the mobile node 370.

Figure 6:
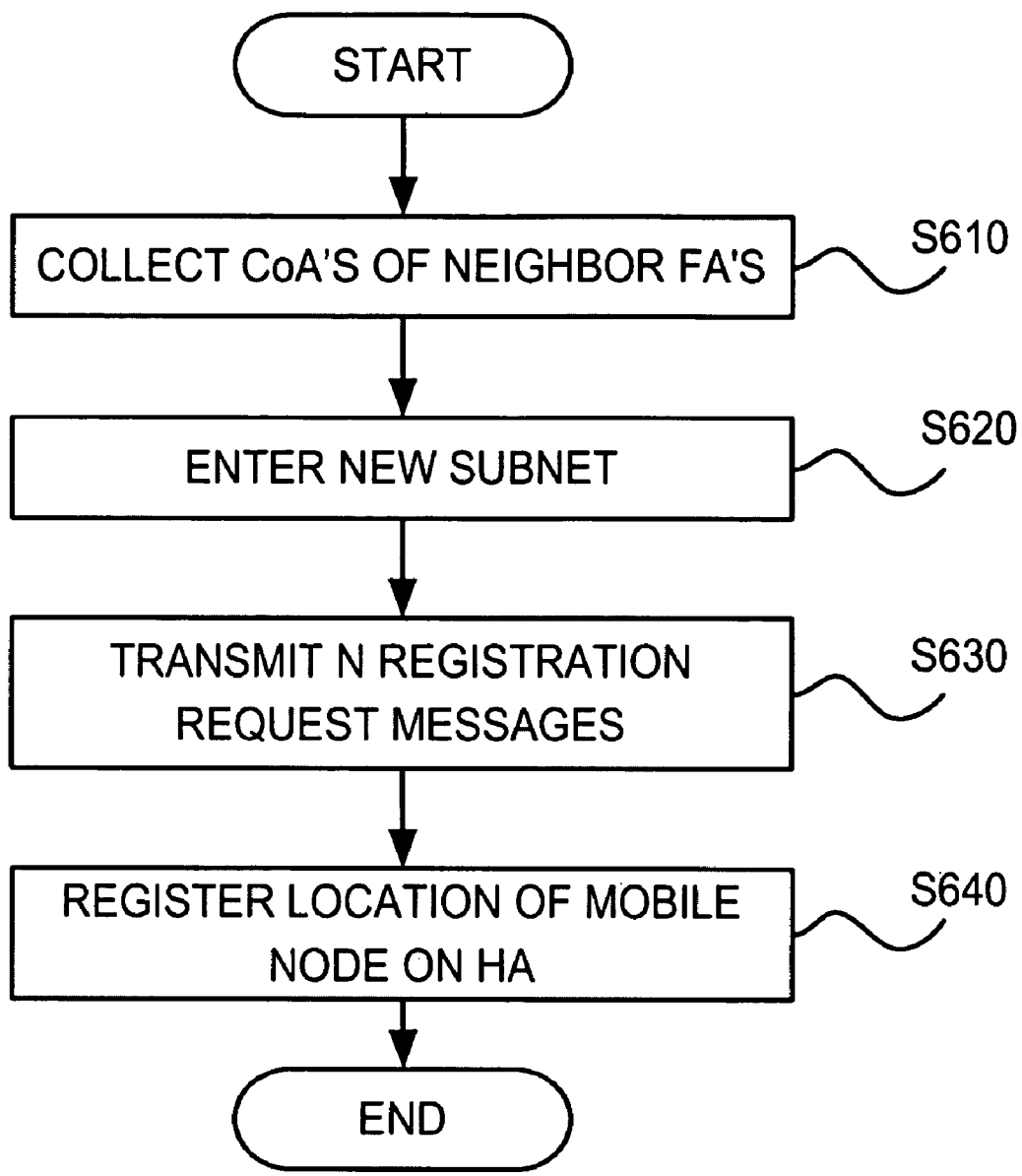
FIG. 6 is a flowchart illustrating a method of registering a mobile node in a mobile IP environment according to an exemplary embodiment of the present invention.

FIG. 6 is a flowchart illustrating a method of registering a mobile node in a mobile IP environment according to an exemplary embodiment of the present invention.

First, the mobile node 370 receives the agent advertisement message from the FA of the current subnet, and collects the CoA's of the neighbor FA's from the received agent advertisement message (S610). In this case, the agent advertisement message is periodically broadcast.

When the mobile node 370 moves to a new neighbor subnet (S620), the mobile node 370 broadcasts a registration request message. In this case, if the mobile node 370 collected N CoA's (where N is a natural number) in the previous subnet, the mobile node 370 transmits N registration request messages each containing one of the N CoA's after entering the new subnet (S630). Alternatively, the mobile node 370 may transmit a single registration request message containing all of the N CoA's.

If the FA of the new subnet determines that one of the CoA's contained in the registration request messages broadcast from the mobile node 370 is identical to that allocated by the FA of the new subnet, the FA forwards the registration request message containing the identical CoA to the HA address indicated in the received registration request message to register the CoA of the mobile node 370 in the HA, so that the HA identifies a transfer path to the mobile node 370 (S640).

According to the present invention, it is possible to allow the mobile node to identify the CoA's of the neighbor FA's from the previous FA in advance. When movement to a new subnet is detected, the stored CoA's can be immediately registered on the HA. In addition, it is possible to minimize jitter generated by movement to a new subnet during a real-time communication, and reduce a burden of buffering and retransmitting the packets to the new FA at the previous FA.

While the present invention has been particularly shown and described with reference to exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A mobile Internet Protocol (IP) network system in a mobile IP environment, the mobile IP network system comprising:
a first foreign agent of a first foreign subnet, the first foreign agent having information on care-of-addresses of foreign agents of subnets adjacent to the first subnet;
a second foreign agent of a second subnet; and
a mobile node which registers on a home agent of the mobile node via the second foreign agent if the mobile node moves from the first subnet to the second subnet,
wherein the mobile node receives, from the first foreign agent, a message containing the care-of-addresses of the foreign agents adjacent to the first subnet, collects the care-of-addresses from the message, and sequentially broadcasts a plurality of messages each including one of the collected care-of-addresses if the mobile node moves to the second subnet, and
wherein the second foreign agent receives the plurality of messages broadcast from the mobile node, extracts the care-of-addresses in the received plurality of messages, and transmits one of the care-of-addresses to the home agent to register the mobile node on the home agent if the one of the care of address is identical to a care-of-address allocated by the second foreign agent.

2. The mobile IP network system according to claim 1, wherein the message received from the first foreign agent is periodically broadcast by the first foreign agent.

3. The mobile IP network system according to claim 2, wherein the message received from the first foreign agent is an agent advertisement message.

4. The mobile IP network system according to claim 1, wherein the plurality of messages broadcast by the mobile node are registration request messages.

5. The mobile IP network system according to claim 1, wherein the plurality of messages broadcast by the mobile node if the mobile node moves to the second subnet includes a number of messages broadcast by the mobile node in the second subnet.

6. The mobile IP network system according to claim 1, wherein at least one message of the plurality of messages broadcast by the mobile node if the mobile node moves to the second subnet contains information on whether another message will be broadcast by the mobile node.

7. The mobile IP network system according to claim 1, wherein if at least one care-of-address message of the care-of-addresses extracted by the second foreign agent is not identical to the care-of-address allocated by the second foreign agent, the second foreign agent waits for a predetermined time to receive another message broadcast by the mobile node.

8. The system of claim 1, wherein said broadcasting is performed after the mobile node moves to the second subnet, and before the mobile node receives an agent advertising message from the second foreign agent.

9. The system of claim 1, wherein said registering the mobile node on the home agent is performed before the mobile node receives an agent advertising message from the second foreign agent.

* * * * *